United States Patent
Polevoy et al.

(10) Patent No.: US 6,854,160 B2
(45) Date of Patent: Feb. 15, 2005

(54) CASTER ASSEMBLY FOR A BED FRAME MEMBER OR FURNITURE

(75) Inventors: Richard Polevoy, Teaneck, NJ (US); Howard Scott Ryan, Skaneateles, NY (US); Paul Eric Carlson, Skaneateles, NY (US)

(73) Assignee: Finger Lakes Intellectual Property, LLC, Teaneck, NJ (US)

( * ) Notice: Subject to any disclaimer, the term of this patent is extended or adjusted under 35 U.S.C. 154(b) by 0 days.

(21) Appl. No.: 10/295,666

(22) Filed: Nov. 15, 2002

(65) Prior Publication Data

US 2003/0115716 A1 Jun. 26, 2003

Related U.S. Application Data

(63) Continuation of application No. 09/519,725, filed on Mar. 3, 2000, now Pat. No. 6,568,031.

(51) Int. Cl.$^7$ .............................................. B60B 33/08
(52) U.S. Cl. ........................................ 16/26; 16/18 CG
(58) Field of Search ........................ 16/24–28, 18 CG, 16/42 R, 31 R; 51/200.1, 201, 216, 218, 220

(56) References Cited

U.S. PATENT DOCUMENTS

| | | | |
|---|---|---|---|
| 970,386 A | * | 9/1910 | Nickerson ...................... 16/26 |
| 985,455 A | * | 2/1911 | Russell ........................... 16/26 |
| 1,060,076 A | | 4/1913 | Glowacki |
| 1,282,396 A | | 10/1918 | Ecaubert |
| 1,383,396 A | * | 7/1921 | Friend ............................ 16/24 |
| 1,482,743 A | * | 2/1924 | Grover .................... 248/188.7 |
| 3,455,526 A | * | 7/1969 | Orii ............................. 248/615 |
| 3,895,597 A | * | 7/1975 | Olevsky .................... 440/12.5 |
| 4,007,502 A | | 2/1977 | Mis |
| 4,080,674 A | * | 3/1978 | Fredman et al. ................ 5/310 |
| 4,404,707 A | * | 9/1983 | Walker ........................ 16/31 R |
| 4,706,329 A | * | 11/1987 | Screen ............................ 16/47 |
| 5,173,990 A | | 12/1992 | Owen |
| 5,555,954 A | * | 9/1996 | Swiderski ................... 182/152 |
| 5,815,860 A | | 10/1998 | Mitchell |
| 5,823,278 A | * | 10/1998 | Geringer ..................... 177/144 |
| 5,873,144 A | * | 2/1999 | Tupper et al. ........... 16/18 CG |
| 5,894,614 A | | 4/1999 | Stroud |
| 6,332,240 B1 | * | 12/2001 | Wu ......................... 16/18 CG |
| 6,397,412 B1 | * | 6/2002 | Quintile ...................... 5/200.1 |
| 6,418,578 B1 | * | 7/2002 | Polevoy et al. .............. 5/200.1 |
| 6,568,031 B1 | * | 5/2003 | Polevoy et al. ................. 16/47 |

FOREIGN PATENT DOCUMENTS

| | | |
|---|---|---|
| DE | 384 801 C | 11/1923 |
| FR | 969 627 A | 12/1950 |
| GB | 185 595 A | 9/1922 |

* cited by examiner

Primary Examiner—Robert J. Sandy
Assistant Examiner—Andre' L. Jackson
(74) Attorney, Agent, or Firm—Klauber & Jackson (57) ABSTRACT

A caster assembly that can be used with furniture to support the furniture and to make the furniture mobile. The caster assembly has a housing with a stem that extends upwardly to be attached to the particular piece of furniture. Within the housing is a plurality of spherical rollers that are supported within the housing so as to be rotatable about their center points and therefore can rotate in any direction as the furniture is moved. In the preferred embodiment, there are three spherical rollers that are all equidistant from the center line or longitudinal axis of the stem so that the weight of the furniture that bears down upon the stem is supported equally by the spherical rollers contacting the floor. As a further feature, a glide cup is provided that can be readily attached and detached from the bottom of the housing and, whet attached, the glide cup covers the spherical rollers and presents a flat, planar surface that contacts the floor.

17 Claims, 9 Drawing Sheets

ABSTRACT

CASTER ASSEMBLY FOR A BED FRAME MEMBER OR FURNITURE

CROSS-REFERENCE TO RELATED APPLICATIONS

The present application is a continuation application of application U.S. Ser. No. 09/519,725, filed on Mar. 3, 2000, now U.S. Pat. No. 6,568,031 the disclosure of which is hereby incorporated by reference herein in its entirety.

BACKGROUND OF THE INVENTION

The present invention relates to a caster assembly for a use with furniture, and, more particularly, to a caster assembly adapted for use with bed rails or a bed frame including side rails and cross members and which allows the weight on the caster to be centrally positioned and further has a glide that can be easily attached and/or detached from the caster assembly.

In general, bed frames are well known and are comprised of various structural members such as side rails and cross members that interconnect the side rails and provide a relatively rigid structure of predetermined dimensions in order to support a box spring and a mattress. The common side rail member and cross member is an L-shaped steel member with various manners of connecting the individual components together.

The components, that is, the side rails and the cross members also are generally provided with legs that extend downwardly toward the floor so that the components are elevated from the floor and include caster assemblies interfitted to the legs to allow the bed frame and completed bed to be moved to differing locations in the room.

Accordingly, the caster assemblies normally have rotatable rollers to facilitate the movement of the bed from one location to another. Such caster assemblies also generally have an elongated stem that interfits with a corresponding female connector on the bed frame leg. That stem has a central longitudinal axis along which is directed the weight of the components of the completed bed, i.e. the box spring, mattress and the like. The roller itself is mounted to the assembly within a housing and the roller is rotatably mounted to that housing to roll about a central axis that is parallel to the plane of the floor. The housing is also pivotally mounted to the frame leg so that the roller itself can not only rotate about its axis, but the housing, including the roller itself, can also pivot 360 degrees about the main longitudinal axis of the stem.

The swiveling action or movement is necessary to correctly align the roller for movement in the proper direction, however, such swiveling movement can be generally difficult to accomplish. For one reason it is apparent that all of the rollers supporting the bed frame must be correctly aligned in order to easily move the bed frame. In most instances, the rollers are positioned in various directions and it is therefore necessary to align all of the rollers at the initial movement of the bed frame. With the weight of the mattress and box spring there is considerable friction acting against the swiveling action of the caster assembly and the problem is aggravated by the need to align some 4–5 rollers in order to roll the bed frame. Additionally, the roller is often embedded into an indentation in the carpet that lies along the surface of the roller and the roller must be moved out of the indentation to swivel. As such, therefore, while the swivel action is necessary to properly move the bed or other furniture, it can be somewhat difficult to get the swivel action to operate easily and thus the initial movement of the bed is not easy to accomplish, particularly when the bed is on carpeting with padding.

The preferred conventional caster for use with carpet is a cylindrical member that contacts the floor at a certain finite distance away from the longitudinal axis of the stem so that the roller can pivot to a position determined by the direction the frame is being moved and then the roller rotates to make that movement easy to accomplish. A typical roller caster assembly is shown and described in U.S. Pat. No. 4,007,502 of Mis. As can be seen in the Mis patent, the roller is offset with respect to the downward force that acts through a stem and, as will become clear, this typical caster of Mis suffers from certain inherent weaknesses.

Thus, since the contact point between the roller and the floor is located at an offset dimension from the longitudinal axis of the stem along which the weight of the bed is directed, a bending moment is created based on the weight of the bed acting downwardly on the stem and the distance between the location of that force along the longitudinal axis of the stem and the point where the roller contacts the floor to support the frame.

One of the difficulties with such casters, therefore, is that the bending moment created by that offset causes stress on the caster assembly and can cause a premature failure of the caster assembly or the bed frame leg itself, thereby disabling the entire unit. The problem is aggravated, of course, with legs having increased degrees of weakness, and in particular, with the use of plastic legs as shown and described in U.S. Pat. No. 3,828,376 of Miller. Accordingly, it would be advantageous to have a caster assembly that has rollers that provide better support for the bed and which do away with the offset that causes the bending moment and the premature fracture of essential components such as the leg of the bed frame, thus avoid damaging the bed frame. There are rollers that have ball bearings the may aid in the swiveling of the roller or aid in the rolling motion of the roller itself but all require the offset and the consequent swiveling action to operate in moving the furniture.

Other prior art furniture support assemblies have, in fact, utilized a plurality of elements that contact the floor and examples are illustrated in U.S. Pat. No. 1,060,076 of Glowacki and U.S. Pat. No. 1,282,396 of Friend. In the aforementioned patents, however, while a plurality of members contact the floor and thus allow the weight to be borne by a plurality of elements, there is a further problem with respect to the ease of moving such casters as the spherical members are clamped into the housing supporting the particular piece of furniture and the spherical contact members do not thus freely rotate to allow the ready movement of the furniture. Accordingly, in Glowacki, the balls that actually contact the floor are clamped tightly into a circular dome and thus are not movable with respect to the dome as the furniture is moved. Therefore, while the prior art did consider the support of the weight of a piece of furniture on a plurality of contact members, the moving of the furniture was not enhanced and only the idea of a strong support was considered and appreciated.

In addition to caster assemblies, there are also glide assemblies that are mounted to the various frame members and have a generally flat, planar bottom contacting the floor. The glide assemblies are preferably used where the bed is located on a hard or slippery surface such as a wood or tile floor and thus the flat bottom does not easily slip or cause damage to the floor itself. With such flooring surfaces, the user of a caster having a roller causes unnecessary sliding or rolling as contrasted to the intended use of a rug roller or caster on a carpeted surface where the friction with the carpet reduces the mobility of the roller or caster.

In the case of bed rails, typically glides are used to support the center member that spans the width between the side rails. The side rails themselves are connected at their ends to a headboard and a footboard and have one or more center supports having a leg or legs that include a glide that contacts the floor to add strength to the assembly. Since the height of the legs on headboards and footboards is not a standard height, it is necessary for the center support for the cross members be adjustable in height so as to provide proper support from the floor for the cross members. Typical cross members and adjustable glides are shown and described in U.S. Pat. No. 5,894,614 of Stroud. As can be seen in that patent, the cross members contacting the floor are adjustable for height by means of a threaded engagement with the leg of the cross member. With such side rails, however, the use of a glide to support a cross member has certain problems, that is, the strength of a glide is needed, yet there is also needed some mobility so that the bed rail type of bed can be moved from one location within a room to another location. In moving the bed rail type of bed, with a center adjustable glide, the glide can catch on the floor, particularly with a carpet, and thus twist the cross member and cause breaking of the leg itself.

Glide assemblies are inherently stronger that caster assemblies since the weight of the bed frame using a glide acts along the longitudinal axis of the glide directly to the point of contact with the floor, and thus, there is no offset from that axis to the point of contact and, hence, no bending moment. In addition, of course, the glide planar surface allows more surface contact with the floor and thus carries the weight of the bed over a wider area so as to provide a better distribution of that weight. As such, the glide assembly has enhanced strength and stability over the caster assembly.

Accordingly differing ideas have been proposed to solve the problem of the height adjustability required for a glide supporting a cross member and most of the ideas relate to the mechanism to bring about that adjustment. As examples of the various approaches to make the glide mechanisms adjustable, note Mitchell U.S. Pat. No. 5,815,860 and U.S. Pat. Nos. 5,894,614 and 4,080,674. From those examples, as well as others, it can be seen that the emphasis is on the adjustable means and not on the point of contact with the floor. In general, all such cross member supports in the prior art utilize a glide in view of its strength, but take along with that asset, the problem of the glides lack of mobility, particularly when moved along a carpeted floor.

A further alternative is with the use of a caster cup that is generally cup shaped that is slid underneath a roller of a caster assemble to aid in slowing the mobility of the caster and to stabilize the piece of furniture, particularly when used on a slippery flooring surface. The caster cups, however, are easily displaced from under the roller since they are not firmly locked to or attached to the caster assemblies and are thus difficult to maintain in place when the furniture is moved during the normal use of the furniture. Thus, over time, the caster cups become displaced with respect to the roller and no longer serve their intended purpose.

Accordingly, it would be advantageous to have a caster assemble that combines the strength and stability of the glide assembly with the mobility of the caster assembly. It would be further advantageous to have a support assembly that eliminates the swivel movement of the caster assembly to allow movement of the furniture to achieve the desirable strength of a glide assembly but additionally have mobility.

In addition, the supplier of casters assemblies and glide assemblies has to make and supply both types of assemblies i.e. caster assemblies and glide assemblies to insure that the customer can have the right assembly for the particular location. It would, obviously be advantageous to be able to use only one assembly and to have that assembly operate as both a glide and a caster assembly at the option of the user so that the user can easily convert the caster assembly to the glide function without the need for special tools or cumbersome methods of carrying out such conversion.

SUMMARY OF THE INVENTION

Now, in accordance with the present invention, an improved caster assembly is shown that overcomes the difficulties of the prior art casters. In the present invention, the caster assembly is adapted for use with furniture, particularly bed frames and bed rails. The structure of the caster assembly comprises a housing that has an upstanding stem that is attachable to the particular structural member of the bed frame by interfitting with a female connector affixed to the bed frame component or by other means.

The stem has a generally vertical elongated longitudinal axis such that the weight of the bed is transmitted to the housing of the caster assembly generally along the elongated axis that is centrally located with respect to the housing. At the bottom of the caster assembly, that is, where the caster assembly is in contact with the floor, there are at least three spherical rollers that normally contact the floor and allow the bed frame to roll with respect to the floor for the convenience of moving the bed from one location to another location within a room. The spherical rollers are mounted to a housing having a cavity and a plurality of small balls are freely located between the housing and the spherical rollers such that each spherical roller is free to rotate omni-directionally, that is, the roller is mounted such that it is free to rotate about its center point and thus can rotate in any direction. As such, therefore, the roller can rotate in any direction that the user pushes the piece of furniture in relocating that piece of furniture and no additional force is needed to commence the initial movement of the furniture.

In the preferred embodiment, there are at least three spherical rollers, more preferably three rollers, so that the weight of the bed frame and its supported components and weights are distributed at three contact points with the floor to better distribute the weight and prevent severe indentation in the floor. In addition, the location of the rollers is such that they are equidistant from the elongated central axis through which the weight of the bed frame acts on the caster assembly and thus, the single bending moment is eliminated and the structure has enhanced strength and stability. As stated, with the three rollers, each is still mounted to a housing such that the rollers move freely in any direction and do not need to be aligned to the direction of movement of the furniture or bed by pivoting about a central axis. In effect, the need for a swiveling function is completely eliminated.

Accordingly, the caster assembly of the present invention has the strength of the prior art glide assemblies since the single offset has been eliminated and, of course, the assembly therefore does not need to swivel in order to allow the furniture or bed to be moved in any direction. With the offset and the need to swivel eliminated, the aforedescribed problems associated with those features are also eliminated.

As a further feature of the present caster assembly, a glide is readily attachable and detachable to convert the caster assembly from a roller caster to a glide function and vice versa. When attached, the glide alters the function of the caster assembly from a roller caster where the rollers are in contact with the floor to a glide function where the caster assembly is transformed into a glide. Accordingly, the bottom surface of the glide is a planar surface as in the case of most glides and the glide is attached and detached without the need for special tools or equipment. It should be noted, that the bottom surface of the glide is referred to as planar, however, typically it is an effective planar surface as there is normally a central portion of the bottom surface that is displaced upwardly and only a peripheral planar area is actually in contact with the floor. The attachment and detachment can be readily accomplished in the home by an installer that can determine at the time of installation whether or not the glide or roller function is applicable.

The resulting caster assembly therefore combines the strength of the glide assemblies with the mobility of a roller caster assembly and provides the user with the option of using the spherical rollers to contact the floor or easily transform the caster assembly to add a glide so that the assembly can be used on slippery surfaced floors.

In such situation, instead of changing the caster itself, the user only needs to attach the glide to the bottom of the caster housing whereupon the rollers are hidden and the lower surface of the caster assembly is a flat surface and therefore suitable for a hard wood or other slippery surface floors. The glide is locked on to the caster housing and does not become detached during the use or movement of the furniture.

In the preferred embodiment the attaching and detaching of the glide is accomplished by an interfitting of the glide to a lower shroud that is positioned at the lower portion of the caster assemble. That lower shroud itself has a plurality of elongated openings generally formed as arcs of a circle with a larger opening portion and a smaller opening portion. The glide has a similar number of upwardly directed tabs that are adapted to fit into the larger post of the openings in the lower shroud. Each of the tabs has an upper lip that is dimensioned to fit through the larger opening portion of the elongated openings but which cannot fit through the smaller opening portions. A locking projection is formed on each of the elongated openings to securely lock the upwardly directed tabs to the lower shroud.

By simply rotating the glide, the tabs are rotated to a position where the tabs are moved into the smaller opening portions where the lips are captured by the lower shroud since the lips cannot pass through the smaller portion openings and the glide is securely retained in position affixed to the lower shroud. By such means, the glide is locked into position onto the lower shroud of the caster assembly and will not come apart while the furniture or bed is being used or even during movement thereof. Once affixed to the lower shroud, the glide thus converts the caster assembly to a glide function, however, even then, the weight is still distributed through the three spherical rollers that bear against the glide and carry the weight of the furniture.

Other features of the caster assembly will become more apparent in light of the following detailed description of a preferred embodiment thereof and as illustrated in the accompanying drawings.

BRIEF DESCRIPTION OF THE DRAWINGS

FIG. 21 is a perspective view of a caster assembly of the present invention adapted to be used with the side rail construction of FIG. 20 and.

DETAILED DESCRIPTION OF THE INVENTION

Figure 1:
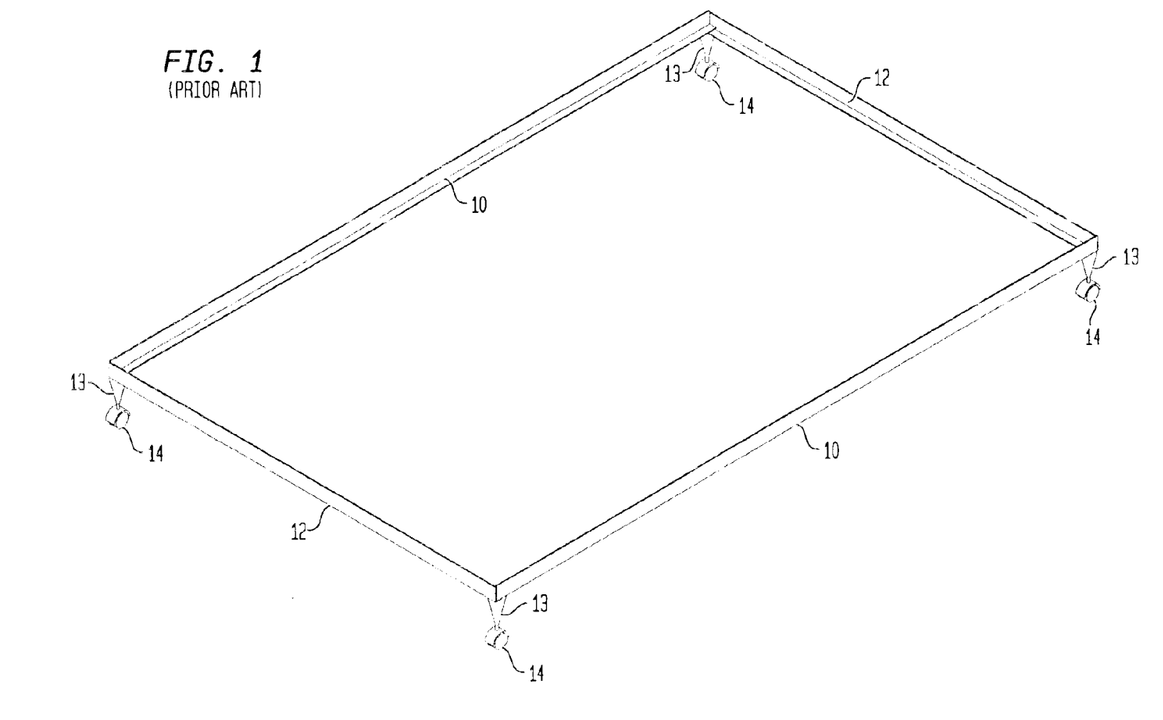
FIG. 1 is a perspective view of a conventional bed frame with which the present invention can be employed.

Referring now to FIG. 1, there is shown a perspective view of a conventional bed frame with which the present invention can be applied. It should be noted, however, that while the FIG. 1 embodiment of the present invention is initially shown and described specifically for use with a bed frame, the broader aspects of the invention make it applicable to any item of furniture with the same advantages and improvements.

Thus, in FIG. 1, the conventional bed frame is comprised of a pair of side rails 10 and cross members 12. The number of cross member may vary depending upon the particular bed, and its size, that is, there may be one or more intermediate cross members that provide additional support to the box spring and mattress when assembled. The side rails 10 and cross members 12 are normally constructed of L-shaped angle iron. As shown, there are legs 13 that are normally located on the cross members 12 or the side rails 10 depending on the particular construction and, if any further cross members are used in the bed frame, there may also be one or more additional legs extending downward from those cross members. At the bottom of the legs 13, there are affixed thereto casters 14 that are in contact with the floor.

Figure 2:
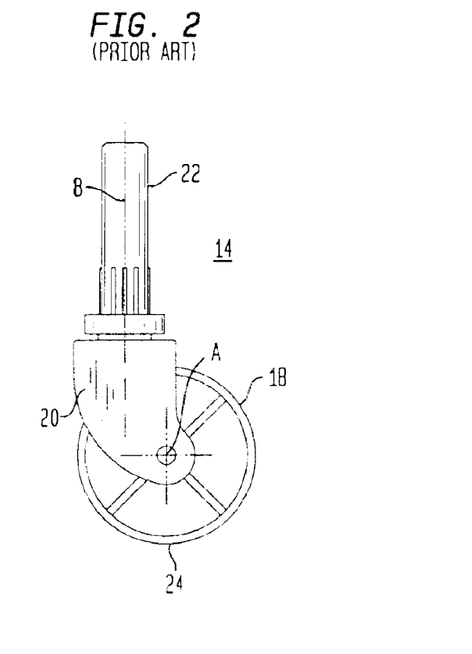
FIG. 2 is a side plan view of a typical prior art caster assembly used in current bed frames.
Figure 3:
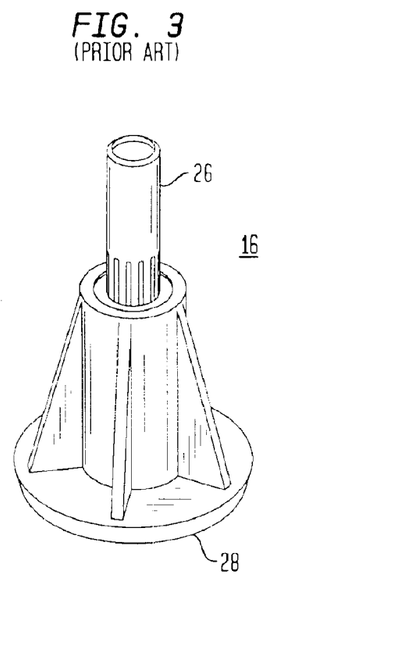
FIG. 3 is a perspective view of a glide that is also currently used in present bed frames.

Taking now FIGS. 2 and 3, there is shown, respectively a side view of a typical caster 14 and a perspective view of a typical glide 16. Either the caster 14 or the glide 16 can be used as a support for a bed frame and each is preferably used in differing circumstances. Taking first the caster 14, as can be seen, the conventional caster comprises a roller 18 that is normally cylindrical and which rotates about an axis, indicated by the letter A, that is positioned parallel to the floor. The caster 14 includes a metal housing 20 having an upstanding stem 22 that extends upwardly and which is inserted into the leg or other support point on the piece of furniture.

The roller 18 thus rolls freely about its axis A in the direction at a right angle to that axis, however, the roller 18 obviously does not freely rotate to move the piece of furniture or bed frame if the user attempts to move that furniture in the direction along the axis of rotation of roller 18. To accomplish moving the furniture in such direction, therefore, it is necessary for the housing 20 to swivel about the axis B of the upstanding stem so that the roller 18 becomes aligned with the proper path of travel. As will be later explained, in order for the housing 20 to swivel there is a necessary offset between the axis B and the point of contact of the roller 18 with the floor.

In the normal movement of the caster 14, the swiveling movement takes place quite automatically as the furniture, such as a bed, is moved in the desired direction since the swivel effect takes place as the initial movement occurs and the roller 18 becomes aligned properly for that direction of movement. As explained, however, the swiveling action can be difficult to accomplish and the initial movement of the furniture therefore is not easily facilitated.

In addition to the swiveling problem, the normal caster, as shown in FIG. 2 also suffers from an inherent weakness in that the weight of the furniture is directed downwardly along the axis B of the upstanding stem 22 whereas the contact with the floor and the support point for the furniture occurs at the point 24 at the bottom of the roller 18. As can be seen, there is an offset or finite distance between the direction of the load imposed by the furniture along the axis B and the point at which that load is supported by the floor. That offset is necessary to accomplish the swiveling action, however, it also sets up a stress in the caster by creating a bending moment in the caster 14 that is always present and can lead to premature failure of the caster 14 and/or the connecting leg.

Accordingly, while the caster 14 is certainly helpful in providing mobility to the piece of furniture, there are inherent weaknesses that can lead to a failure of the caster or the leg of the bed frame itself that are always present due to the basic design of the caster and can lead to the possibility of damage to the caster or other structural components of the bed frame.

Turning to FIG. 3, a glide 16 is shown and which is also used with furniture as a support, particularly where the piece of furniture is located on a hardwood or tile floor. Again, the glide 16 includes an upstanding stem 26 that is adapted to be inserted into the leg or other support point of the furniture. The glide 16 has a flat bottom surface 28 and is thus preferred on the aforementioned floors and, unlike the caster 14, is exceptionally strong since the weight of the furniture acting downwardly along the main axis of the upstanding stem 26 is directly supported by the contact with the floor and there is therefore no offset to that force that can cause stress. The glide is typically used on a bed rail assembly and can be used on carpeted floor for strength, however the added friction between the bottom of the glide and the carpeted floor make the potential of damage to the bed structure more likely.

On the other hand, of course, with the use of glide 16, the mobility of the furniture is sacrificed. Not only is the mobility of the furniture sacrificed, but there is an additional weakness in the glide 16 if the furniture is attempted to be moved since the glide 16 does not move readily along a carpet, for example, and any attempt to slide the furniture along that type of flooring can cause the glide to get caught on the material and cause the glide to snap off from the upstanding stem 26 or worse, to break off a leg or other part of the furniture. This is particular true where the glide is positioned at the center of a bed frame affixed to a cross member since that location is already a relatively weak structure and is subject to bending and breaking.

Therefore, since the present caster assembly 30 does not need to swivel in order to allow the piece of furniture to be moved, as was the case with the prior art rollers, the present caster assembly 30 can be affixed to the piece of furniture in a wider variety of ways, such as being attached offset to the side of the furniture as the center of the caster assembly 30 need not be the particular point of the caster assembly that is actually affixed to the furniture. With the prior art swivel casters, particularly those screwed into the furniture, such versatility was not present and the means and location of attachment to the furniture was limited.

Figure 4:
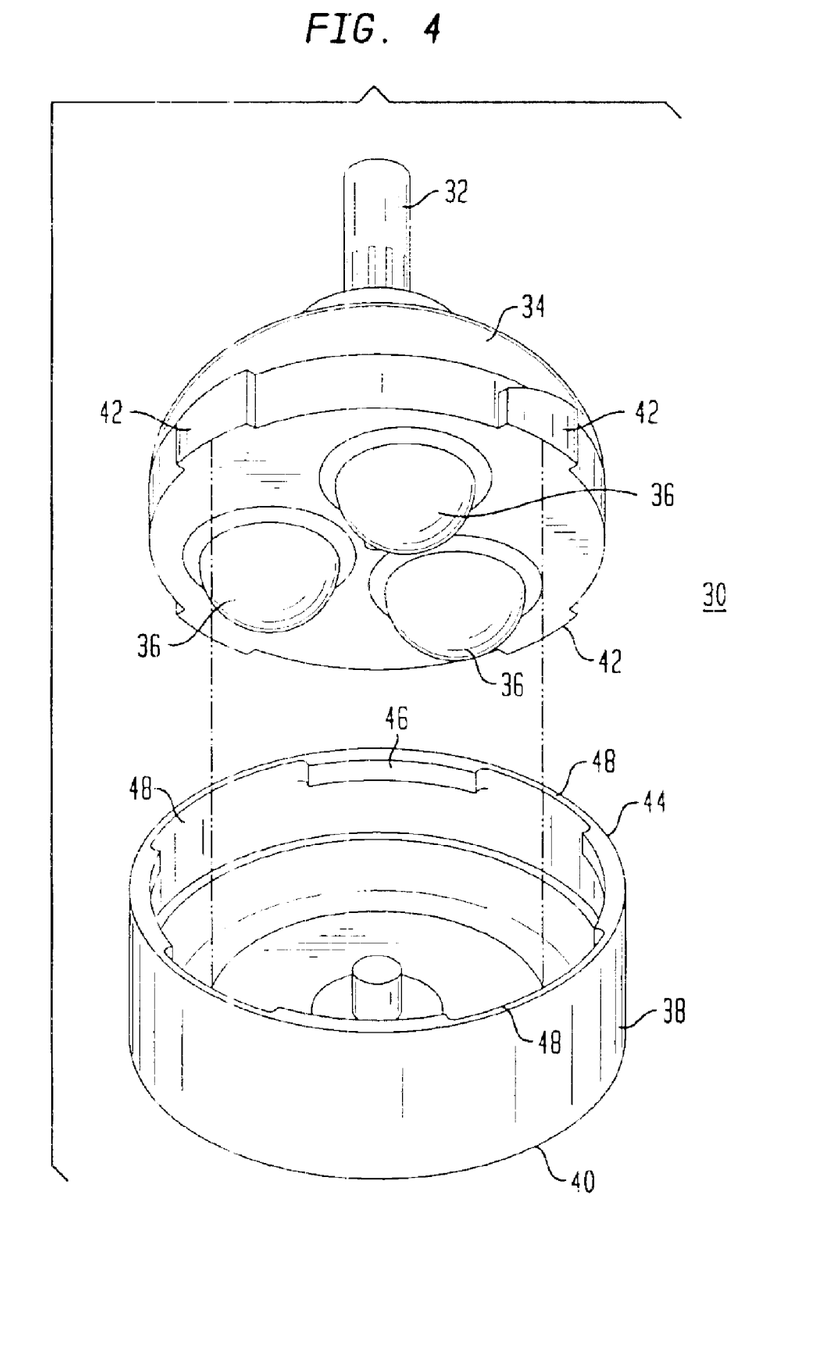
FIG. 4 is an exploded perspective view of a caster assembly constructed in accordance with the present invention.

Turning now to FIG. 4, there is shown an exploded view of a caster assembly 30 constructed in accordance with the present invention. In the Figure, the caster assembly 30 includes an upstanding stem 32 that again, is adapted to enter and be secured to the particular piece of furniture to which the caster assembly 30 is attached. As noted, the stem 32 will be described that interfits with a leg of a bed frame assembly, however, the stem 32 may have a flat flange at its upper point with suitable holes so that the caster assembly can be secured to a piece of furniture by means of wood screws or other securing means. A housing 34 is provided and from which the upstanding stem 32 extends and within which is positioned a plurality of spherical rollers 36. In the preferred embodiment, and as is shown in FIG. 4, three spherical rollers are utilized. Each of the spherical rollers 36 extend downwardly external of the housing 34 and, as such, contact the floor when in position supporting a piece of furniture.

In this embodiment, the spherical rollers 36 can be formed of plastic material, particularly a plastic having good lubricity and a good memory, one example of which is available commercially from the DuPont Company under the trademark Delrin. That same material can be used for other components of the caster assembly 30 such as the housing 34. A glide cup 38 is also provided that is readily attached and detached from the housing 34 so that the contact with the floor can be by means of the spherical rollers 36 or, at the option of the user, by contact with the flat, planar bottom 40 of the glide cup 38. The glide cup 38 can also be made of the same plastic material as previously described.

In order to allow the glide cup 38 to be readily attached and detached to the housing 34, there is provided at the lower perimeter of the housing 34, at least one projection 42 that extends outwardly from the lower perimeter. Again, in this embodiment, there are a plurality of such projections 42 extending from the housing 34. Glide cup 38 has an upstanding flange 44 having formed therein, an internally facing ridge 46 with a plurality of recesses 48 that dimensionally coincide with the projections 42 on the housing 34. Thus when the glide cup 38 is to be attached to the housing 34, the glide cup 38 is positioned over the lower periphery of the housing 34 and the projections 42 fit through the recesses 48 so that the glide cup 38 can be fully moved over the lower periphery of the housing 34.

The projections 42 thus pass through and clear the internally facing ridge 46 after passing through the recesses 48 such that the glide cup 38 can be simply rotated a predetermined amount and lock the projections 42 behind the internally facing ridge 46 so that the glide cup 38 is securely attached to the housing. In the position with the glide cup 38 attached to the housing, the caster assembly 30 acts as a glide and the spherical rollers 36 are contained within the glide cup 38. As is obvious, therefore, the glide cup 38 can, by another predetermined rotation, be just as easily detached from the housing 34 so that the spherical rollers 36 can contact the floor.

When the glide cup 38 is installed, the spherical rollers 36 touch and actual bear on the upper surface of the glide so that, in use, the weight of the bed or other furniture is distributed through the spherical rollers 36 to the glide cup 38 such that the weight of the furniture is well distributed to the glide cup 38 and there is no weight acting on any of the projections 42 or other likely breakable components.

The spherical rollers 36, as can be seen, preferably have centers of rotation and thus are free to rotate omni-directionally, that is, in any direction about their center point of the spherical shape. In addition, in the preferred embodiment, the centers of the spherical rollers 36 are positioned equidistant from the main axis of the upstanding stem 32 so that the weight of the furniture that acts along the main axis of the upstanding stem 32 is equally distributed among the spherical rollers 36 in their contact with the floor. With the weight distribution equally divided, the overall weight is borne by the main axis of the caster assembly 30 and thus through the strength of the assembly. Accordingly, the present caster assembly 30 provides the mobility of the prior art casters while having the strength and structural integrity of the prior art glides. In addition, with the addition of the glide cup 38 the caster assembly 30 can also have the non-marring flat planar surface to contact the floor whenever desired and without difficulty.

Figure 5:
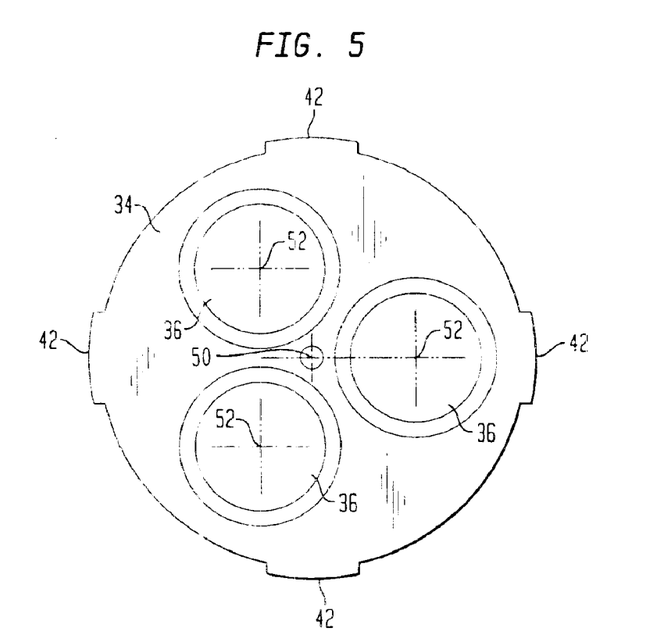
FIG. 5 is a bottom plan view of the caster assembly of FIG. 4.

Turning now to FIG. 5, there is shown a bottom plan view of the caster assembly 30 constructed in accordance with the present invention and with the glide cup 38 not attached thereto. In this Figure, the physical layout of the spherical rollers 36 can be further explained. In particular, the main, longitudinal axis of the upstanding stem (not shown in FIG. 5) is at the center point 50 of the caster assembly 30 and the weight of the furniture is therefore concentrated along that axis and therefore acting downwardly at about the center point 50. Also shown are the center points 52 of the spherical rollers 36. Thus, it can be seen that the center points 52 of the spherical rollers 36, in the preferred embodiment, are all equidistant from the main longitudinal axis of the upstanding stem so that the weight of the furniture is equally distributed among the three spherical rollers 36 and along the center and the structural strength of the caster assembly 30.

Figure 6:
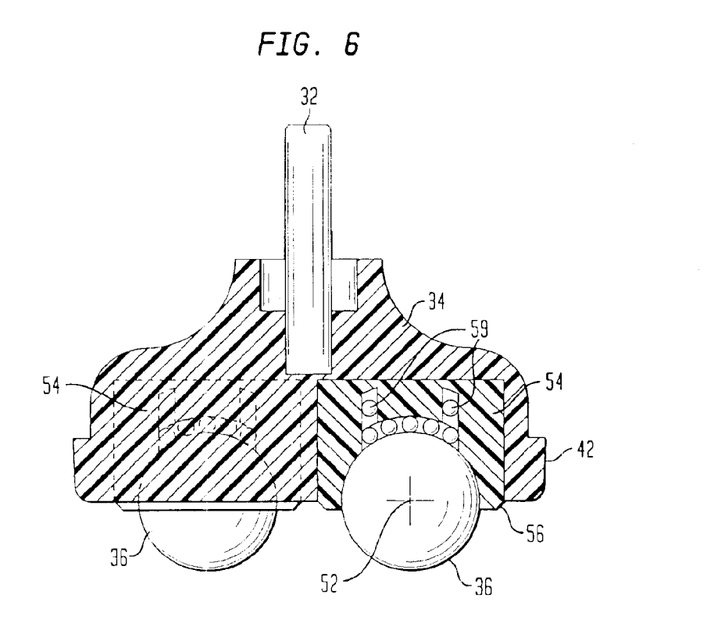
FIG. 6 is a side cross-sectional view of the caster assembly constructed in accordance with the present invention.
Figure 7:
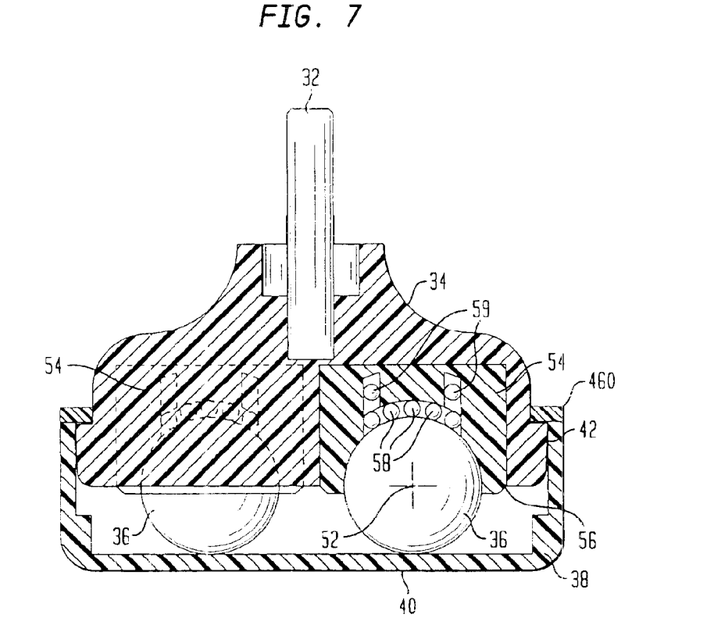
FIG. 7 is a side cross sectional view of the caster assembly having the glide component attached thereto.

Turning next to FIGS. 6 and 7, there is shown, respectively, a side cross sectional view of the caster assembly 30 without the glide cup 38 attached and a side cross sectional view with the glide cup 38 attached. The spherical rollers 36 may be provided in commercially available self-contained cartridges 54 that can be inserted into suitably shaped holes 56 formed in housing 34. In order to allow the spherical rollers 36 to freely rotate about their center points 52, a plurality of small spherical balls 58 are freely position within the cartridges 54 and freely movable within an annular recess 59 and which allow the spherical rollers 36 to be able to rotate in any direction readily and with a minimum of friction. While a annular recess 59 is shown, the same omni-rotation of the spherical rollers 36 can be accomplished, albeit less efficiently, without the use of the annular recess 59 such that the small spherical balls 58 are simply located at the upper surface of the spherical rollers 36. In a still further less efficient construction, the small spherical balls 58 can be eliminated altogether. Such mechanisms are readily available commercially including the spherical rollers contained within a housing with small spherical balls freely floating intermediate the housing and the spherical rollers 36 to allow the spherical rollers 36 to freely rotate about their center points in any direction, that is, onmi-directionally.

In FIG. 7, the addition of the glide cup 38 can be seen with the internally facing ridge 46 locked in position behind the projections 42 so that the glide cup 38 is securely affixed to the housing 34 and the spherical rollers 36 are covered by the glide cup 38 and out of operational use.

Figure 8:
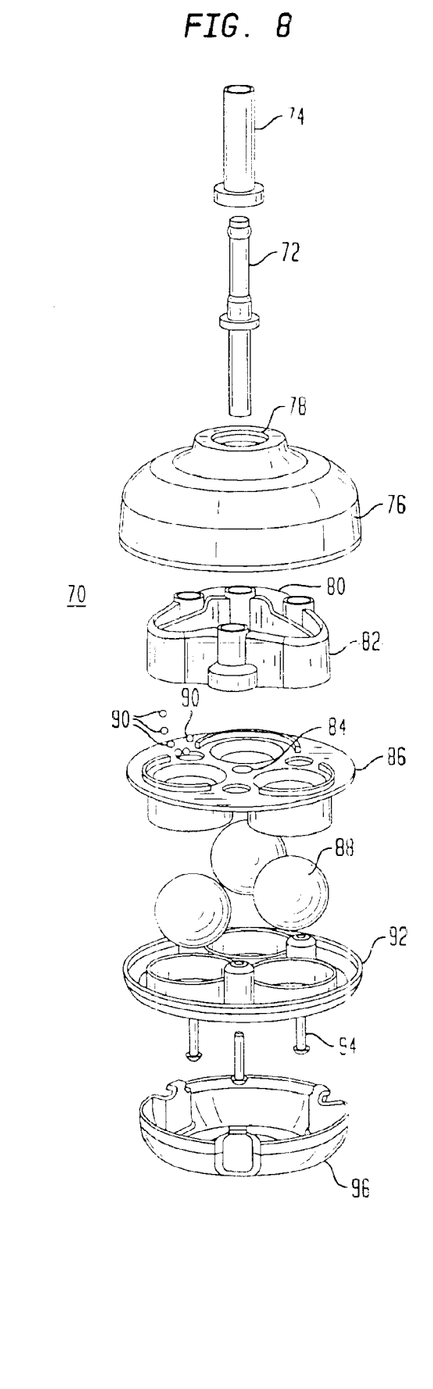
FIG. 8 is a perspective exploded view of the preferred embodiment of the caster assembly of the present invention.

Turning now to FIG. 8, there is shown a perspective, exploded view of the preferred embodiment of the caster assembly 70 of the present invention and in view of a later more detailed description of the individual components, a brief description of those components will be initially discussed and new designation numbers assigned even though many components are the same as or similar to the components used in the prior embodiments.

Accordingly, as shown in FIG. 8, there is a spindle 72 that, as explained, is used to affix the caster assembly 70 to the particular piece of furniture. Atop of the spindle 72 is positioned a bushing 74 that is preferably of a plastic material such as polypropylene. The bushing 74 enables the caster assembly 70 to be inserted into the female opening normally provided in furniture, including bed frames and the structural members that make up beds in general. The bushing 74 is pressed onto the spindle 72 and is thus held thereto by an interference fit. By convention, the components will also be referred to as upper and lower throughout and such reference shall be intended to denote the upper direction as toward the piece of furniture and the lower direction to be towards the floor on which the furniture is supported. By that convention, therefore, the bushing 74 is positioned on the upper portion of the spindle 72 and the lower portion of the spindle 72 extends through an upper shroud 76 through an opening 78.

The lower portion of the spindle 72, when assembled, further passes through a central bore 80 formed in a stem housing 82. As will be seen, the spindle 72 is in an interference fit in the central bore 80 such that the stem housing 82 is pressed on to the spindle 72 to affix the spindle 72 firmly to the stem housing 82. The spindle 72 continues with its lower end fitted, again, in an interference fit, into the bore 84 of a ball cup 86. A plurality of spherical rollers 88 are fitted within the ball cup 86 by a snap fit as will be explained and a plurality of smaller balls 90 are located atop of the spherical rollers 88 to aid in the omni-rotation of those spherical rollers 88.

Beneath the spherical rollers 88, there is positioned a lower shroud 92 and which is affixed to the upper shroud 76 by means such as drive screws 94. Finally, as shown in the FIG., there is a glide cap 96 that is removably affixed to the lower shroud 92 so as to be easily attached and detached from the lower shroud 92.

Figure 9:
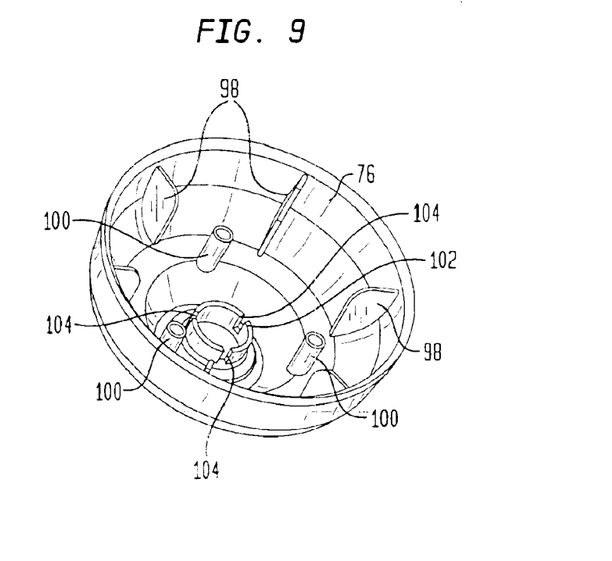
FIG. 9 is a bottom perspective view of an upper shroud component of the preferred embodiment of the present invention.

Turning now to FIG. 9, taken along with FIG. 8, there is shown a bottom perspective view of the upper shroud 76 and which has in its interior a plurality of locating ribs 98 and bosses 100 that extend downwardly to receive the drive screws 94 when the lower shroud 92 is affixed to the upper shroud 76. In addition, as can be seen, there is an annular flange 102 that extends downwardly into the interior of the upper shroud 76 and which has a plurality of slots 104 formed therein. In the preferred embodiment, the upper shroud 76 is formed of a molded plastic material such as polypropylene.

Figure 10:
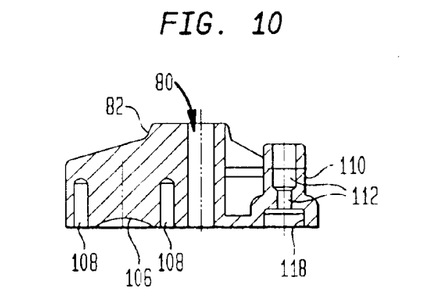
FIG. 10 is a side cross sectional view of a stem housing component of the preferred embodiment.

With reference to FIG. 10, taken along with FIG. 8, there is shown a side cross sectional view of the stem housing 82. In that Fig. the central bore 80 can be seen through which the lower portion of the spindle 72 passes in an interference fit in affixing the spindle 72 to the stem housing 82. As also can be seen, the is a spherical indentation 106 formed in the lower surface of the stem housing 82 having a predetermined radius and center point and an annular recess 108 extending upwardly from the lower surface of the stem housing 82 and surrounding the spherical indentation 106. As shown, of course, there are preferably three spherical indentations 106 that conform to the preferred number of spherical rollers 88 employed in the preferred embodiment. In addition, there is formed in the stem housing 82, a plurality of upwardly directed bosses 110, having internal bores 112, the purpose of which will be later explained.

Figure 11:
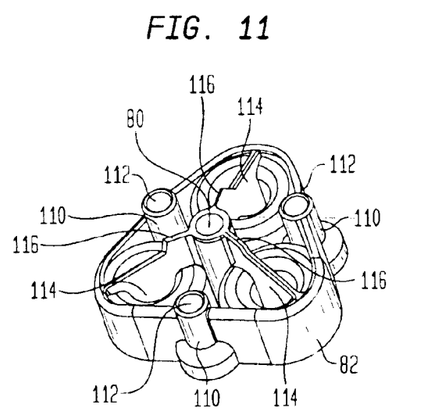
FIG. 11 is a top perspective view of the component of FIG. 10.
Figure 12:
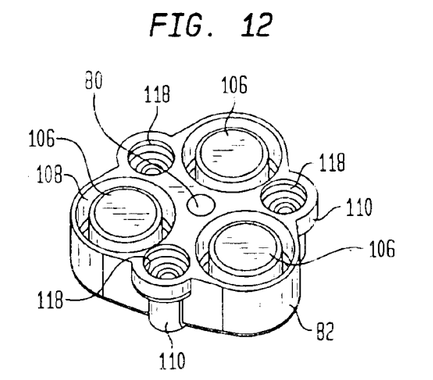
FIG. 12 is a bottom perspective view of the component of FIG. 10.

Turning now to FIGS. 11 and 12, taken along with FIG. 8, there is shown, respectively, a top perspective view and a bottom perspective view of the stem housing 82. In FIG. 11, there can be seen, a plurality of ribs 114 extending outwardly from the central bore 80 and which preferably comprise three ribs 114 wherein the upper edges 116 of such ribs 114 fit into the slots 104 (FIG. 9) of the upper shroud 76 when the overall caster assembly 70 is assembled into a completed unit. As further shown in FIG. 11, the upwardly directed bosses 110 comprise three bosses 110 and the internal bores 112 of those bosses 110 are dimensioned so as to receive the bosses 100 of the upper shroud 76 (FIG. 8), again, when the overall caster assembly 70 is assembled. Further enlarged bores 118 are formed in the stem housing 82 along the internal bores 112 in the lower surface of the stem housing 82 (FIGS. 10 and 12) and are also utilized to allow the overall caster assembly 70 to be compactly and sturdily assembled together into the completed unit.

Figure 13:
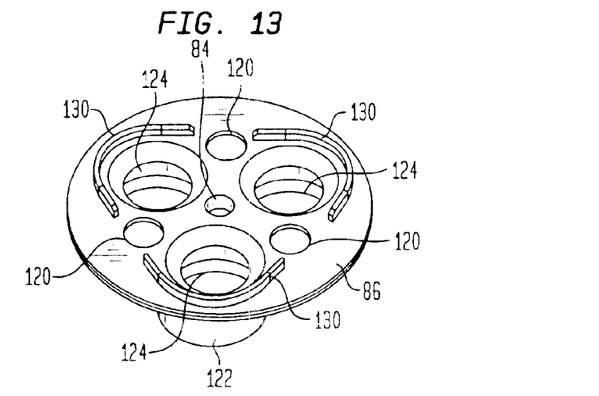
FIG. 13 is a top perspective view of the ball cup component of the preferred embodiment.
Figure 14:
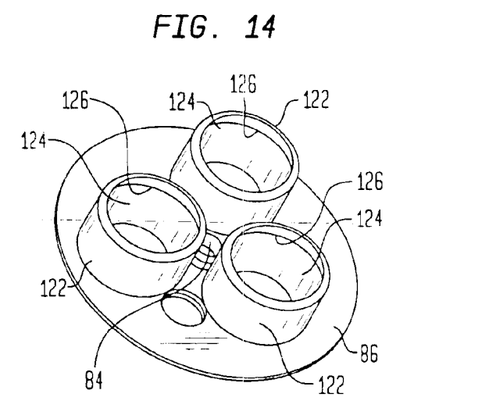
FIG. 14 is a bottom perspective view of the ball cup component of FIG. 13.

Turning now to FIGS. 13 and 14, taken along with FIG. 8, there is shown, a top perspective view and a bottom perspective view, respectively, of the ball cup 86 of the present invention. There is thus shown, the bore 84 within which the lower end of the spindle 72 terminates in an interference fit upon assembly. Surrounding the bore 84 are openings 120 that, as will be seen, contribute to the overall compactness of the completed assembly. Three circular flanges 122 extend downwardly from the ball cup 86 and contain the spherical rollers 88. The internal cavity 124 of those circular flanges 122 is formed in a generally spherical configuration and includes a circular ridge 126 that is used to contain those spherical rollers 88 in a snap fit. As seen, with reference to FIG. 13, the upper peripheral surface 128 surrounding each of the internal cavities 124 is slightly chamfered inwardly in a gently sloping surface leading into the internal cavities 124. Slightly raised flanges 130 partially surround the upper periphery of the internal cavities 124.

Figure 15:
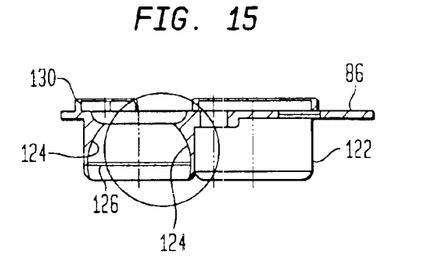
FIG. 15 is a side cross sectional view of the component of FIG. 13.

Turning to FIG. 15, there is shown a side cross sectional view of the ball cup 86 such that one of the internal cavities 124 can be seen with the internal spherical configurations. As will be seen, the configuration and the dimensions of the spherical internal cavity 124 as such that the spherical rollers 88 can simply be snapped into those internal cavities 124 and retained in that position where the spherical rollers 88 are contained but can freely rotate in any direction, that is, omni-directionally. In the preferred embodiment, the spherical rollers 88 are comprised of an acetal plastic material.

Figure 16:
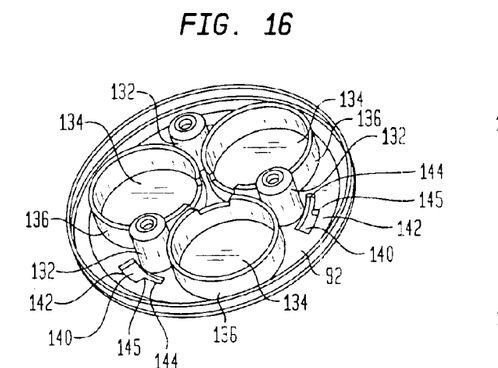
FIG. 16 is a top perspective view of the lower shroud component of the preferred embodiment.

Next, in FIG. 16, taken with FIG. 8, there is shown a top perspective view of the lower shroud 92 and which has its external peripheral surface mate with the external peripheral surface of the upper shroud 76 to contain the components of the completed caster assembly 70. In this Fig. the lower shroud 92 includes three bosses 132 that extend upwardly and, when the caster assembly 70 is assembled, the bosses 132 extend through the openings 130 of the ball cup 86 (FIGS. 13 and 14) to contact and fit into the enlarged bores 118 of the stem housing 82 (FIGS. 11 and 12). The lower shroud 92 also includes a plurality (preferably three) of openings 134 having circular flanges 136 that extend upwardly and through which the circular flanges 122 of the ball cup 86 pass (FIG. 14) in the assembly of the overall caster assembly 70.

In the lower surface 138 of the lower shroud 92, there is formed a series (three) of elongated slots 140 having a longitudinal axis forming a circular arc. As can be seen, the elongated slots 140 comprise a larger width portion 142 and a smaller width portion 144 about that arced configuration. In addition, there are small projections 145 formed at the entrance to the smaller width portions 144 that extend slightly into the elongated slots. The purpose for the elongated slots 140 will become apparent from a discussion of the next Figures.

Figure 17:
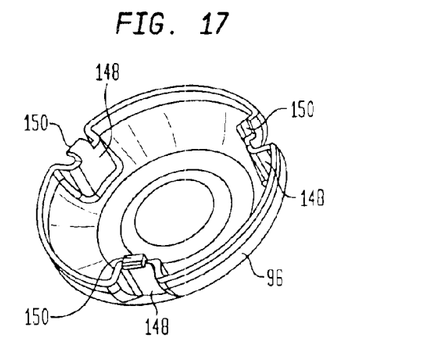
FIG. 17 is a is top perspective view of a glide cup component of the preferred embodiment.
Figures 18, 19:
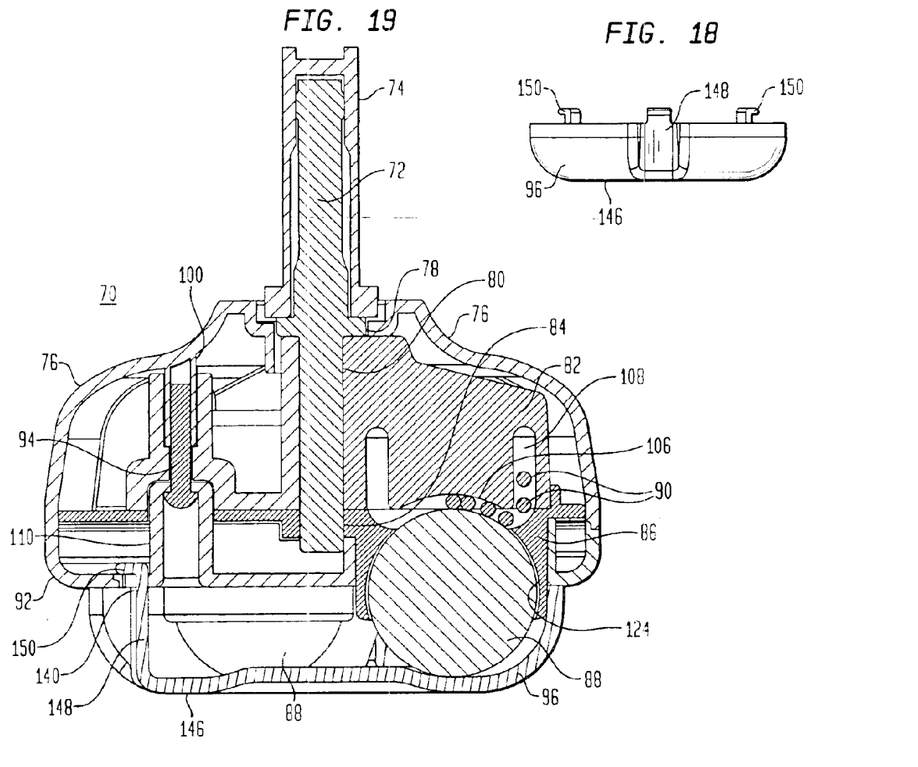
FIG. 18 is a side view of the component of FIG. 17.
FIG. 19 is a side cross sectional view of the preferred embodiment of the caster assembly of the present invention.

Thus, turning to FIGS. 17 and 18, taken along with FIG. 8, there is shown a top perspective view and a side view of the glide cap 96 that is used with the present invention. As explained, the glide cap 96 is designed to be easily affixed to and removed from the overall caster assembly 70 to convert the caster assembly 70 between its different functions of action as a roller assembly and a glide assembly. Thus, in FIGS. 17 and 18, there is a lower surface 146 that is generally planar and is adapted to contact the floor when the glide cap 96 is installed with the caster assembly 70. A plurality of tabs 148 are molded into the glide cap 96 and which, itself is preferably a plastic molded polypropylene material. Again, the preferred number of tabs 148, as shown, is three. At the upper end of the tabs 148, three are formed lips 150 that are directed outwardly with respect to the center of the glide cap 96.

Thus, returning to FIG. 16, taken along with FIG. 17 and 18, the interaction of the tabs 148 and the elongated slots 140 can be explained. In affixing the glide cup 96 to the lower shroud 92, the tabs 148 align with the larger width portions 142 of the elongated slots 140 in the lower surface 138 of the lower shroud 92 such that the glide cup 92 can be positioned to insert those tabs 148 through the larger width portions 142. Thereafter, by merely rotating the glide cup 96, the tabs 148 can enter the smaller width portion 144 where the lips 150 are captured by the lower surface 138 of the lower shroud 92. The smaller width portions 144 prevent the passage of the lips 150 therethrough and thus the glide cup 96 is readily and easily retained to the lower shroud 92 so that the caster assembly 70 acts as a glide. As the tabs 148 pass by the small projections 145, the tabs 148 are effective locked into position and do not readily become detached by normal use of the bed or movement thereof. Obviously, the removal of the glide cup 96 is just as easily accomplished by a reversal of the process, that is, the glide cup 96 is rotated to the position where the tabs 148 are in alignment with the larger width portions 142 so that the lips 150 can pass through the elongated slots 140 and the glide cup 96 removed.

Taking FIG. 19, there is shown a side cross sectional a view of the completed and assembled caster assembly 70. In the Fig, therefore, it can be seen that the spherical rollers 88 are fitted into the ball cup 86 and are freely rotatable therein omni-directionally and the plurality of smaller balls 90 freely move within the annular recess 108 to allow the movement of the spherical rollers 88. Those smaller balls 90 move over the upper surface of the spherical rollers and are contained within the area between the spherical rollers 88 and the spherical indentations 106 in the stem housing 82. In the assembled form, as shown in this Fig., therefore the drive screws 94 affix the lower shroud 92 to the upper shroud 76 to encase all of the components in the overall caster assembly 70 in accordance with the present invention. Alternatively, of course, in the place of drive screws 94, other means could be used, such as self tapping, thread cutting screws.

Figure 20:
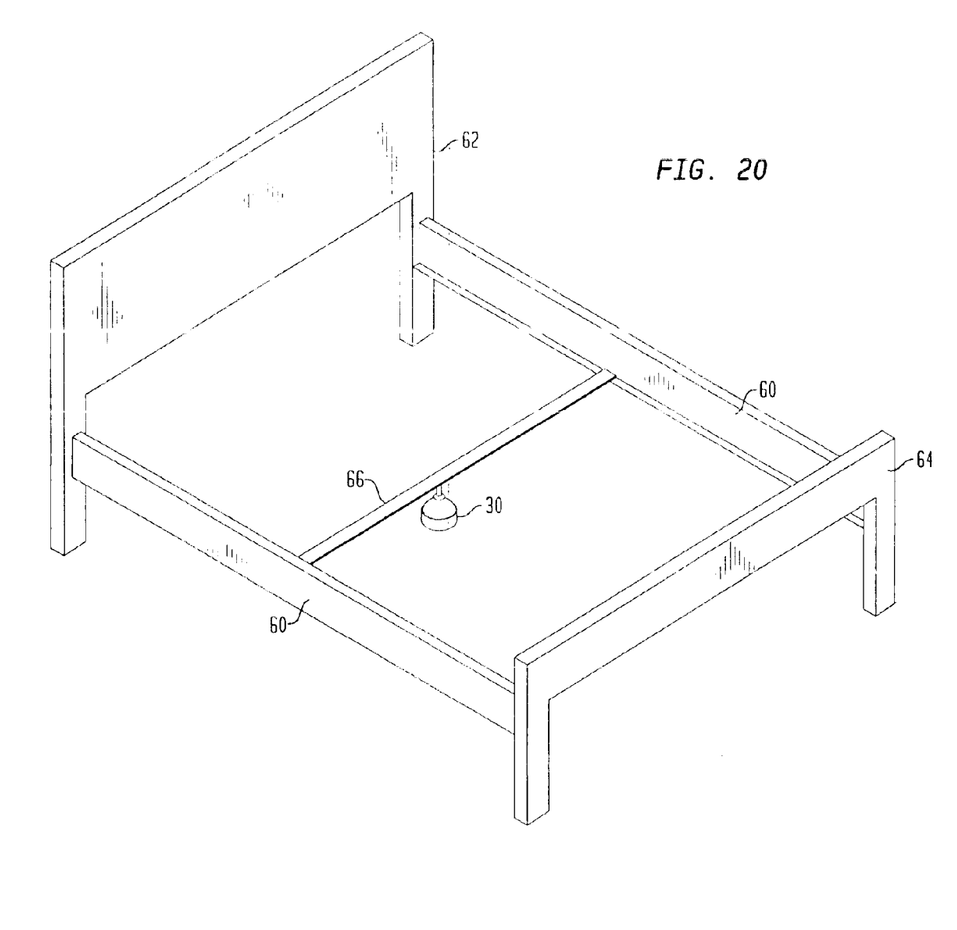
FIG. 20 is a perspective view of bed rails connecting between a headboard and a footboard including a cross member.

Turning now to FIG. 20, there is shown a perspective view of bed rails 60 connecting between a headboard 62 and a footboard 64 and showing a cross member 66. As can be seen, with the use of bed rails 60, the vertical height of the bed rails 60 above the floor is not a standard dimension and depends on the height of the legs of the headboard 62 and the footboard 64. Accordingly the cross member 66 must have a support that is adjustable as to height. In such case, a caster assembly 30 is provided that supports the center of the cross member 66 and is adjustable in height but still has the advantages as previously explained with respect to mobility and strength of the caster assembly 30. The cross member 66 may also be of the type that is universally adapted for use with bed rails and is further disclosed in a U.S. Patent application filed on the same day as the present application and entitled UNIVERSAL TENSION SPRING SUPPORT MEMBER FOR BED RAILS OR BED FRAME, and the disclosure of that application is incorporated herein by reference.

Figure 21:
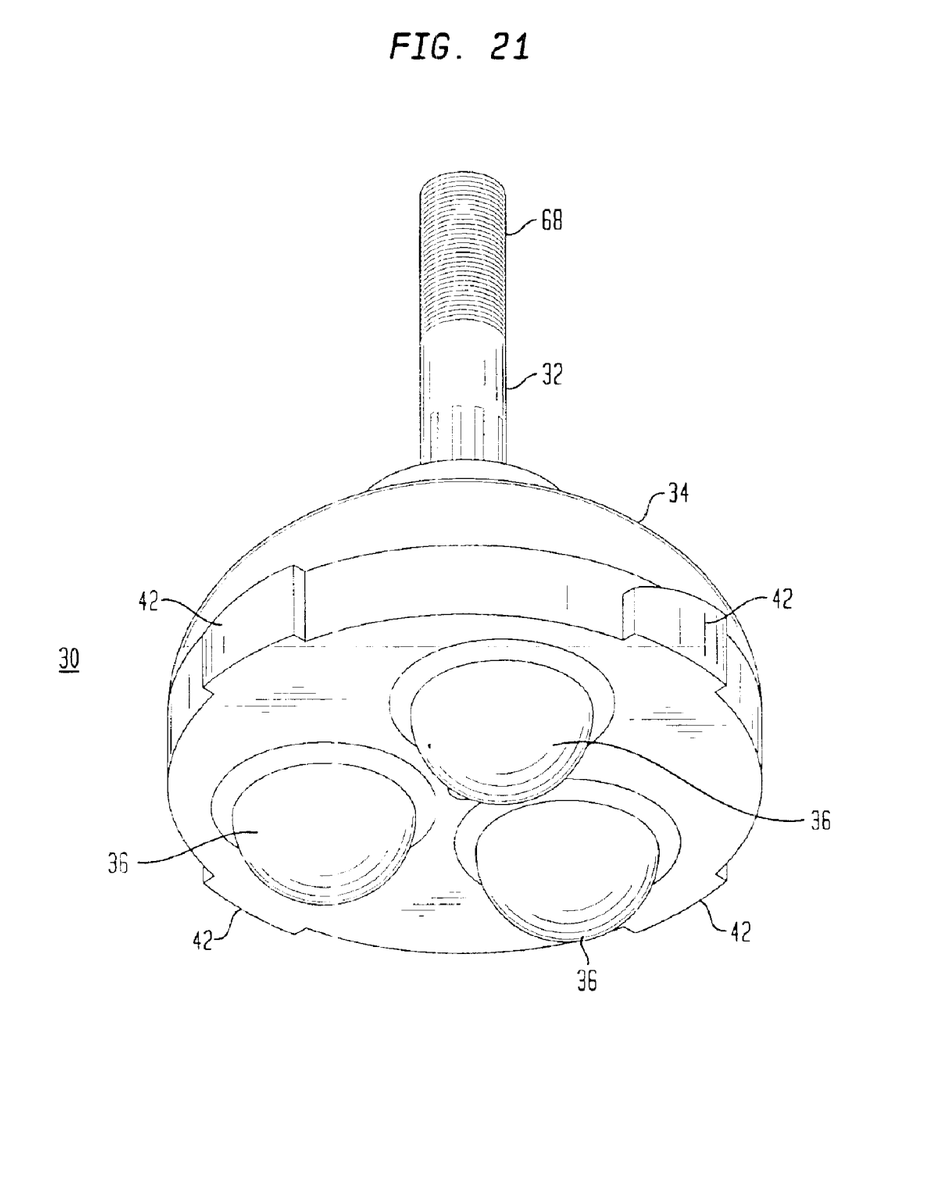

Thus, turning to FIG. 21, there is shown a perspective view of a caster assembly 30 that is adjustably affixed to the leg extending downwardly from the cross member 66 so as to contact the floor and provide support to the overall completed bed. Thus, in this embodiment, the upstanding stem 32 is threaded at 68 and is screwed into a corresponding internally threaded opening in the leg of the cross member 66. This embodiment is not, however, the preferred embodiment. The preferred embodiment is to affix the caster assembly to the furniture by means of a plastic bushing shown in FIG. 8 that is press fitted into the suitable opening in the piece of furniture. As stated, since the caster has considerable strength, it can be used in place of a conventional glide that is normally used with such cross members and yet the caster assembly 30 is also mobile and can readily be moved along a bare wood floor or a carpeted floor without suffering the breakage problems associated with the use of a normal glide.

Therefore, with the use of the caster assembly of the present invention, the cross member can be supported with the strength of a standard glide, have the adjustability to enable the user to adapt the caster assembly to varying heights of the cross member from the floor and yet have mobility so the completed bed can easily be moved to a different position within a room.

While the present invention has been set forth in terms of a specific embodiment or embodiments, it will be understood that the caster assembly herein disclosed may be modified or altered by those skilled in the art to other configurations. Accordingly, the invention is to be broadly construed and limited only by the scope and spirit of the claims appended hereto.

We claim:

1. A caster assembly for supporting a load asserted by a piece of furniture positioned on a generally planar surface, said caster assembly comprising a housing adapted to be affixed to the furniture, said housing containing at least one spherical roller, said at least one spherical roller adapted to contact the generally planar surface for supporting said caster assembly, a plurality of spherical balls located in area intermediate said at least one spherical roller and said housing, an annular recess formed in said housing and extending upwardly from said intermediate area, said spherical balls adapted to move in a continuous circulatory path within said annular recess in said housing wherein said spherical balls are not in contact with said at least one spherical roller and said spherical balls enter said intermediate area from said annular recess by means of gravity, wherein said at least one spherical roller is freely rotatable under load to allow movement of the piece of furniture in any direction.

2. A caster assembly as defined in claim 1 wherein said at least one spherical roller comprises a plurality of spherical rollers each having a center point and said plurality of spherical rollers are each freely rotatable about said center point.

3. A caster assembly as defined in claim 2 wherein said plurality of spherical rollers comprises three spherical rollers.

4. A caster assembly as defined in claim 3 wherein said caster assembly supports a bed frame.

5. A caster assembly as defined in claim 3 wherein said housing has an upstanding stem affixed to said housing and wherein upstanding stem is threaded.

6. A caster assembly as defined in claim 3 wherein said assembly has an outer configuration of an ornamental design.

7. A bed frame or bed rails for location on a floor, said bed frame or bed rails comprising a pair of side rails spaced apart and generally parallel to each other, at least one cross member affixed between said pair of side rails and spanning the space between said side rails, at least one caster assembly depending downward from at least one of said side rails or said cross member to contact the floor, said caster assembly comprising a housing, said housing containing at least one spherical roller depending downwardly therefrom to contact the floor for supporting the weight of said bed frame directed upon said caster assembly generally along a vertical axis, a plurality of spherical balls located in an area intermediate said at least one spherical roller and said housing, an annular recess formed in said housing and extending upwardly from said intermediate area, said spherical balls adapted to move in a continuous circulatory path within said annular recess in said housing wherein said spherical balls are not contact with said at least one spherical roller and said spherical balls enter said intermediate area from said annular recess by gravity, wherein said at least one roller is freely rotatable under load to allow movement of said bed frame in any direction.

8. A bed frame or bad rails as defined in claim 7 wherein said at least one spherical roller comprises three spherical rollers.

9. A bed frame or bed rails as defined in claim 7 wherein said caster assembly further includes a glide cup having a planar lower surface and an upper surface, said glide cup adapted to be attached to said housing to enclose said at least one spherical roller wherein said planar lower surface contacts the floor and is detachable from said housing wherein said at least on spherical roller contacts the floor.

10. A bed frame or bed rails as defined in claim 9 wherein said housing has a lower perimeter having a plurality of projections adapted to engage and retain said glide cup to attach said glide cup to said housing.

11. A bed frame or bed rails as defined in claim 10 wherein said glide cup has an upstanding flange adapted to surround the lower perimeter of said housing, said upstanding flange having an internally facing ridge with a plurality of recesses formed therein, and said plurality of projections interfit through said plurality of recesses attach said glide cup to said housing.

12. A bed frame or bed rails as defined in claim 9 wherein said caster assembly has a lower surface having a plurality of arced elongated slots and wherein said glide cup includes a plurality of upstanding tabs adapted to fit into end be retained within said elongated slots.

13. A bed frame or bed rails as defined in claim 12 wherein said arced elongated slots comprise portions of larger width and portions of smaller widths.

14. A bed frame or bed rails as defined in claim 13 wherein said glide cup is affixed to said lower surface by inserting said tabs in said larger width portions and rotating said glide cup to position said tabs in said smaller width portions.

15. A bed frame or bed rails as defined in claim 14 wherein said arced slots includes projections inwardly disposed and adapted to retain said tabs in said smaller portions of said arced slots.

16. A bed assembly supported on a floor, said bed assembly comprising a pair of bed rails and at least one cross member affixed to said bed rails and located intermediate said bed rails, a caster assembly affixed to said cross member and adapted to contact the floor to support said cross member, said caster assembly having a housing and at least one freely rotatable sphere depending downwardly to contact the floor, a plurality of spherical balls located in an area intermediate said at least one freely rotatable sphere and said housing, an annular recess formed in said housing and extending upwardly from said intermediate area, said spherical balls adapted to move in a continuous circulatory path within said annular recess in said housing wherein said spherical balls are not in contact with said at least one freely rotatable sphere and said spherical balls enter said intermediate area from said annular recess by gravity whereby the at least one freely rotatable sphere is rotatable about a sphere centerpoint, said caster assembly being threadedly engaged to said at least one cross member to enable said caster assembly to be vertically adjusted with respect to said cross member.

17. A bed assembly as defined in claim 16 wherein said at least one freely rotatable sphere comprises three spheres.

* * * * *